United States Patent
Perrodin et al.

(10) Patent No.: US 10,852,210 B2
(45) Date of Patent: Dec. 1, 2020

(54) METHOD AND APPARATUS FOR DETERMINING THE SENSITIVITY OF AN ACOUSTIC DETECTOR DEVICE

(71) Applicant: DISTRAN AG, Zurich (CH)

(72) Inventors: Florian Perrodin, Zurich (CH); Joel Busset, Zurich (CH); Fritz Menzer, Zurich (CH)

(73) Assignee: DISTRAN AG, Zurich (CH)

( * ) Notice: Subject to any disclaimer, the term of this patent is extended or adjusted under 35 U.S.C. 154(b) by 0 days.

(21) Appl. No.: 16/794,868

(22) Filed: Feb. 19, 2020

(65) Prior Publication Data

US 2020/0182735 A1 Jun. 11, 2020

Related U.S. Application Data

(63) Continuation of application No. PCT/EP2019/054773, filed on Feb. 26, 2019.

(30) Foreign Application Priority Data

Feb. 27, 2018 (EP) ..................... 18020084

(51) Int. Cl.
*G01M 3/24* (2006.01)
*G01H 3/00* (2006.01)
(52) U.S. Cl.
CPC ............. *G01M 3/243* (2013.01); *G01H 3/005* (2013.01)
(58) Field of Classification Search
CPC .............................. G01M 3/243; G01H 3/005
See application file for complete search history.

(56) References Cited

U.S. PATENT DOCUMENTS

| 4,036,057 A | 7/1977 | Morais |
| 5,533,383 A * | 7/1996 | Greene ................... G01M 3/24 73/40.5 A |

(Continued)

FOREIGN PATENT DOCUMENTS

| EP | 3 015 838 A1 | 5/2016 |
| WO | 95/32412 A1 | 11/1995 |

OTHER PUBLICATIONS

Huseynov, Javid J. "Distributed Localization of Ultrasonic Sources of Gas Leak Dissertation." PhD diss., University of California, Irvine, 2008. (Year: 2008).*

(Continued)

*Primary Examiner* — Rehana Perveen
*Assistant Examiner* — Chuen-Meei Gan
(74) *Attorney, Agent, or Firm* — Faegre Drinker Biddle & Reath LLP (57) ABSTRACT

A method for estimating the sensitivity in an environment of a sound emission detector device capable of detecting a physical phenomenon producing a spatially limited sound emission, said detector device comprising a transducer array, said method comprising a) receiving at least one signal from at least one respective transducer of the transducer array, said array being place within said environment, b) estimating from the at least one signal received at step a) a detection threshold value of a spatially limited source sound emission parameter, c) estimating from the detection threshold value estimated at step b) a quantity representative of a magnitude of the physical phenomenon, d) displaying the quantity estimated at step c) so as to inform the user of the sensitivity of the detector.

16 Claims, 5 Drawing Sheets

(56) References Cited

U.S. PATENT DOCUMENTS

| | | | |
|---|---|---|---|
| 6,600,824 B1* | 7/2003 | Matsuo | H04R 3/005 381/122 |
| 2003/0164044 A1 | 9/2003 | Gayle | |
| 2008/0181430 A1* | 7/2008 | Zhang | H04R 1/406 381/92 |
| 2009/0000381 A1 | 1/2009 | Allison et al. | |
| 2009/0296946 A1 | 12/2009 | Zhang | |
| 2010/0272286 A1* | 10/2010 | Bai | G03B 42/06 381/92 |
| 2012/0045068 A1 | 2/2012 | Kim et al. | |
| 2012/0287749 A1* | 11/2012 | Kutlik | G01S 5/18 367/7 |
| 2015/0052979 A1* | 2/2015 | Cho | G01M 3/243 73/40.5 A |
| 2015/0153243 A1* | 6/2015 | Al-Sayed Wahba | F17D 5/005 73/40 |
| 2015/0160333 A1 | 6/2015 | Kim et al. | |
| 2016/0011072 A1* | 1/2016 | Hale | G01F 1/662 702/48 |
| 2016/0084729 A1* | 3/2016 | Huseynov | G01S 3/808 73/40.5 A |
| 2017/0102365 A1* | 4/2017 | Hermann | G01N 29/4427 |
| 2017/0322307 A1* | 11/2017 | Martin | G01S 15/885 |
| 2019/0271610 A1* | 9/2019 | Perrodin | G01M 3/243 |

OTHER PUBLICATIONS

Lathoud, Guillaume, M. Magimai Doss, and Hervé Bourlard. "Threshold Selection for Unsupervised Detection, with an Application to Microphone Arrays." In 2006 IEEE International Conference on Acoustics Speech and Signal Processing Proceedings, vol. 3, pp. III-III. IEEE, 2006. (Year: 2006).*

Perrodin, Florian, Janosch Nikolic, Joël Busset, and Roland Siegwart. "Design and calibration of large microphone arrays for robotic applications." In 2012 IEEE/RSJ International Conference on Intelligent Robots and Systems, pp. 4596-4601. IEEE, 2012. (Year: 2012).*

Eret, Petr, and Craig Meskell. "Microphone arrays as a leakage detection tool in industrial compressed air systems." Advances in Acoustics and Vibration 2012 (2012). (Year: 2012).*

Guenther, Thomas, and Andreas Kroll. "Automated detection of compressed air leaks using a scanning ultrasonic sensor system." In 2016 IEEE Sensors Applications Symposium (SAS), pp. 1-6. IEEE, 2016. (Year: 2016).*

Distran AG, "Automatic threshold computation," Patent Short Description, v. 1.0.19, Distran AG, Zurich Switzerland, Feb. 11, 2017, 3 pages.

Dougherty, "OptiNav Air Leak Detection System," Optinav, Inc., Redmond, WA, USA, Dec. 10, 2009, 6 pages.

Invensense, "Microphone Array Beamforming," Application Note AN-1140, InvenSense Inc., San Jose, CA, USA, Dec. 31, 2013, Revision 1.0, pp. 1-12.

Knowles Acoustics, "Ultrasonic MEMS Sensor SPM0404UD5," Digi-Key Electronics, May 6, 2011, pp. 1-4.

Kotus et al. "Detection and localization of selected acoustic events in acoustic field for smart surveillance applications," Multimedia Tools and Applications, Springer, Sep. 2014, vol. 68, pp. 5-21.

Lathoud et al., "Threshold Selection for Unsupervised Detection, with an Application to Microphone Arrays," idiaap.ch, URL: http://publications.idiap.ch/downloads/papers/2006/lathoud06b.pdf, 2005, 4 pages.

Naranjo et al., "Expanding the Use of Ultrasonic Gas Leak Detectors: A Review of Gas Release Characteristics for Adequate Detection," Gases & Instrumentation, Nov.-Dec. 2009, pp. 24-29.

Naranjo, "Fixed Ultrasonic Gas Leak Detection," Instrumentation 2013 Expo, Los Angeles, CA, USa, Mar. 15, 2013, 31 pages.

Extended European Search Report issued in related application EP 18020084.2, dated Aug. 31, 2018, 7 pages.

PCT Search Report issued in related application PCT/EP2019/054773, dated Jul. 12, 2019, 3 pages.

* cited by examiner

METHOD AND APPARATUS FOR DETERMINING THE SENSITIVITY OF AN ACOUSTIC DETECTOR DEVICE

CROSS-REFERENCE TO RELATED APPLICATIONS

This application is a continuation of the International Patent Application No. PCT/EP2019/054773 filed Feb. 26, 2019, which claims the benefit of European Patent Application No. 18020084.2 filed Feb. 27, 2018, the contents being incorporated herein by reference.

FIELD

The disclosure concerns the estimation of the sensitivity of a detector device that comprises a transducer array (for example an array of electro-acoustic transducers such as microphones). Such detector devices may allow detecting physical phenomena producing a spatially limited sound emission, e.g., a gas leak, an electrical discharge, an undesired friction in a machine, etc.

BACKGROUND

In particular, ultrasound gas leak detection is used in environments where compressed gases are used. Industrial processes often make use of compressed gases or pressurized liquids. These may present considerable health risks, e.g. by being toxic or asphyxiating, or may even cause large-scale accidents, e.g. in the case of flammable gases or liquids. Leaks may occur due to a difference of pressure and the difficulty to ensure tightness of tubes, valves and machinery.

Detectors may be used to mitigate the various risks associated with a leak.

Gases or liquids escaping from a leak into the surrounding air may cause the emission of sound waves in the surrounding environment, for example due to turbulences at the interface layer between the escaping gas and the surrounding air at rest. These sound waves may be detected and localized by detectors with a transducer array.

Such detectors may comprise multiple ultrasonic transducers and processing means to perform the localization of possible sources of noise, e.g., by beamforming, acoustic holography, etc.

Current handheld acoustic gas leak detector devices do not give any indication of a detection threshold, with respect to the phenomenon of interest, within the current environment.

The user may therefore not be aware of which failures are likely to be detected or not.

There is thus a risk that a detector device may be used in an environment that does not actually permit its use, e.g. in a very loud environment, including but not limited to the case where the transducers are likely to be saturated. In such conditions, the user is likely to believe that no leaks are present, even though no valid information about the presence of leaks could be obtained.

There is a need for more reliability for the user.

SUMMARY

Disclosed is a failure detection device comprising a transducer array to detect gas leaks of industrial equipment or other possible failures that produces a spatially limited sound emission, e.g. wear of a bearing. A spatially limited sound emission may be a sound emission from sources that are confined to a limited space, for example to a volume of 10 cubic centimeters around a gas leak, to a surface of a machine, or to a volume of air surrounding an electrical discharge. Each transducer is able to measure a signal of a physical parameter related to sound, such as sound pressure or particle velocity.

The signals measured by a plurality of transducers are processed so as to localize a possible source of sound emission. The disclosed embodiment operates based on a recognition that the sensitivity of such a detector actually depends on the environment. Sounds emanating from sources in the environment greatly influence the sensitivity.

Disclosed is a method for estimating the sensitivity in an environment of a sound emission detector device capable of detecting physical phenomena producing a spatially limited sound emission, said detector device comprising a transducer array comprising a plurality of transducers, each transducer being able to measure a physical parameter related to sound, and processing means arranged so as to be capable of locating a possible source of sound emission from a plurality of signals measured by the plurality of transducers of the array, said method comprising a) receiving at least one signal from at least one respective transducer of the transducer array, said transducer array being placed within said environment, b) estimating from the at least one signal received at step a) a detection threshold value of a spatially limited source sound emission parameter, c) estimating from the detection threshold value estimated at step b) a quantity representative of a magnitude of the physical phenomenon, d) displaying the quantity estimated at step c) so as to inform the user of the sensitivity of the detector device within this environment.

This method may allow the user to be aware of the smallest quantity representing a physical phenomenon a detector device with a transducer array is likely to detect in a determined environment.

Such method allows to easily determine the sensitivity of the detector device within a determined environment, for example the smallest gas leak that the detector device is able to detect in this environment.

That is, the user may for example be aware that leaks smaller than 50 liters per hour will not be detected in a determined environment.

The quantity estimated at step c), that corresponds to the detection threshold value of step b), may represent the smallest magnitude of the physical phenomena that is likely to be detected by the detector device.

Step d) may give the user a feedback on the quality of information that is produced, and therefore allow the user to react accordingly. For example, if the user deems the threshold with respect to the phenomenon of interest, e.g., a leak rate threshold, to be too high, noise sources, such as machinery not related to the search for failures, can be shut down until the threshold is at an acceptable level.

The transducers may allow recording sound signals and/or ultrasound signals.

The transducers may be placed so as to be surrounded by air, i.e., the signals measured by the transducers result from pressure variation in the air. The transducers may for example measure sound pressure in the air, particle velocity in the air, or other.

The transducers may thus be outside a housing.

The array may comprise two, three, four or more transducers, advantageously more than four transducers, advantageously more than 30 transducers, e.g. 50 or 100 transducers.

The transducers may advantageously have an omnidirectional directivity characteristic.

The transducers of the array preferably have overlapping coverage.

The at least one signal received at step a) may be representative of sound within the environment.

The at least one signal received at step a) may be measured while the transducer array is in the environment.

The at least one signal that is received at step (a) may be both measured and transmitted to processing means that perform steps (b) and (c) when the transducer array is in the environment.

The at least one signal received at step a) may be measured while the transducer array is in the environment, and steps (b), (c) and (d) may be performed immediately after this measurement, i.e. less than 1 minute after the measurement, advantageously less than 1 second after this measurement.

Steps (b), (c) and (d) may be performed only after a lapse of time after the measurement, e.g., the measured signals may be stored for more than one minute, e.g. more than one hour, before the processing of steps (b) to (d) be performed. In this case, such a post processing may be done with different processing parameters, different algorithms, etc. In an embodiment, the quantity estimated at step c) may be a quantity of a parameter that is function of a size of a leak, e.g., a flow rate, an area of a leak, etc. The phenomenon the detector device allows to detect may thus be a gas leak, which clearly is a physical phenomenon that produces a spatially limited sound emission.

Alternatively, the quantity estimated at step c) may be a quantity of a parameter that is function of a voltage and/or a current, e.g., a voltage (in Volts for example), a current (in Amperes), a power (in Watts for example) or an energy (in Joules for example). The phenomenon the detector device allows to detect may thus be an electrical discharge, a partial discharge, or a corona discharge.

Alternatively, the quantity estimated at step c) may be a quantity of a parameter that is function of a force, e.g., a frictional force (in Newtons for example), a power (in Watts for example) or an energy (in Joules for example). The phenomenon the detector device allows to detect may thus be a sliding friction, for example within a machine in a plant.

At step c), estimating may comprise converting the detection threshold value estimated at step a) into the quantity representative of a magnitude of the physical phenomenon.

Advantageously, steps a), b), c) and d) may be reiterated, e.g. every time the processing means detect from the signals measured at the transducers that the environment has changed, for example if the sound pressure level measured at a transducer during 1 second slightly differs from the sound pressure level measured at this transducer during the preceding second.

Advantageously, steps a), b), c) and d) may be reiterated repeatedly during the operating of the detector, e.g. more than 10 times per hour, advantageously, more than 5 times par minute, advantageously, more than 5 times per second.

Advantageously, the reiterating may be regular, e.g., every hour, every minute, every second or every 100 ms.

The disclosure may thus allow to determine in real time the sensitivity of the detector device in the current conditions/environment.

Of course, the disclosure is not limited to real-time estimation of the sensitivity. One may for example consider estimating the sensitivity only once a day, only when the detector device is installed in a new environment, etc.

Advantageously, at step a), a plurality of signals are received from a plurality of respective transducers of the array.

Advantageously, the plurality of transducers may operate in tandem. That is, the signals received at step a) may result from measures made simultaneously and the signals received at step a) may be synchronized.

Alternatively, a signal from a single transducer could be received.

The detection threshold value estimated at step b) corresponds to a minimum of detection of the detector device. It may for example be estimated by seeking the smallest value of the source sound parameter that is detected, or alternatively by another method, provided that said another method is chosen so as to provide a result that is equal or close to a minimum of detection. Said another method may be determined based on a knowledge of the detector device, or else.

Advantageously, at step b), the detection threshold value is estimated taking into account the positions of the transducers measuring the signals received at step a), e.g., the relative positions of the transducers. For example, the method may comprise, at step b), processing the at least one received signal to detect a source.

Alternatively, the positions of the transducers may not be taken into consideration.

Advantageously, the method may comprise, at step b), processing the at least one (advantageously, several) received signal to detect a source that is spatially limited. For example, if more than one signal is received, a beamforming method may be used, or acoustic holography, or any other method that allows detecting (and possibly locating) a spatially limited source.

Advantageously, in case a source is detected from signals issued from a plurality of transducers, the method also comprises estimating its location. The method may comprise performing the localization of a possible source.

For example, the method may comprise estimating values of spatially limited source spatial coordinates that correspond to the spatially limited source whose sound emission parameter is estimated.

In an embodiment, the method may comprise, at step b), obtaining an acoustic image of the environment. This acoustic image represents estimated sound emission parameter values for a number of coordinates, e.g., for a number of solid angles.

Advantageously, the acoustic image is obtained taking into account a preferred distance between the transducer array and the coordinates for which sound emission parameters are estimated. Said distance may be called a focus distance, analogous to the focus distance of an optical imaging device.

The parameter whose detection threshold value is estimated at step b) may for example be a spatially limited source sound pressure level (SPL), or particle velocity level, or else.

The detection threshold value of the spatially limited source sound emission parameter that is estimated at step b) may correspond to a real source, to a simulated source, or to a purely hypothetical/virtual source.

Advantageously, the method may comprise, before step a), a previous step resulting in adding at least one signal representative of an acoustic parameter of a spatially limited source. This signal may be an acoustic wave, a digital signal, an analog signal, or so. Such active detection may be done for example by:

providing a spatially limited acoustic source within the environment, e.g, with a loudspeaker, a known leak, a ball bearing, or other; and/or simulating a spatially limited acoustic source by adding at least one additional signal to, respectively, the at least one measured signal. That is, the at least one signal received at step a) originates from a respective at least one transducer, but it may have undergone a processing consisting in adding an additional at least one signal. The simulated signal or signals may have been computed previously, so as to correspond to the acoustic signal that would have been measured if the simulated source had been there, or may have been recorded previously. In this latter case, step c) may allow obtaining a result derived from a physically measured magnitude of the phenomenon of interest.

The method may thus comprise providing or simulating a spatially limited acoustic source that produces sound emissions, e.g., in the range between 0 and 100 dB SPL at 1 m.

Advantageously, step b) may comprise processing the at least one received signal to detect a sound emission resulting from the previous step. That is, it is tested whether a source (provided or simulated) is detected or not.

Advantageously, in case an active detection is performed, the method may comprise repeating the previous step, step a) and the processing of the at least one received signal to detect the source of the previous step iteratively, with at the previous step various values of the provided/simulated sound emissions, to determine the smallest detectable acoustic or simulated source, whose sound emission parameter is then kept as the detection threshold value determined at step b).

The previous step, step a) and the processing may be repeated until the processing results in an absence of detection.

For example, the steps may be repeated iteratively with a smaller sound emission parameter value at each loop as long as step b) results in a detection of a source. The previous step, step a) and step b) may be repeated until the processing done at step b) results in an absence of detection.

For example, the steps may be repeated iteratively with a higher sound emission parameter value at each loop as long as step b) results in an absence detection of a source. The previous step, step a) and step b) may be repeated until the processing done at step b) results in a detection.

Advantageously, a bisection or dichotomy method may be used.

The method may comprise comparing a result of the processing of the at least one signal received after a previous step (with a real acoustic source or a simulated one) has been executed to a result of a similar processing done with at least one signal received during a passive listening, e.g., comparing two acoustic images (in the case a plurality of signals was received). If a difference is detected, it is considered that a source is detected. The steps may advantageously be repeated iteratively with acoustic or simulated sources of different sound emissions at each iteration, to determine the smallest detectable acoustic or simulated source, whose sound emission parameter is then kept as the detection threshold value determined at step b).

Alternatively, the method may not comprise neither providing a real acoustic source nor simulating it, i.e., the at least one signal received at step a) may result from a passive listening of the environment.

In case passive listening only is performed, step b) may comprise estimating a first value from the at least one received signal and determining the detection threshold value from this first value.

The determination method may imply only predetermined values and this first value, e.g. adding 5 dB to the first value.

Alternatively, the determination method may imply the first value and at least one other value obtained from the at least one signal received at step a). For example, a height of a side lobe (e.g. of a point spread function, i.e. a height of a local maximum of a point spread function, outside the global maximum of said point spread function), a side lobe pattern, etc. in an acoustic image resulting from the passive listening may be taken into consideration when estimating the detection threshold.

Advantageously, the determination may be done such that the estimated detection threshold value is smaller than the first value, e.g., a positive sound parameter value may be subtracted from the first value, e.g., 11 dB.

The first value may result from a spatial processing. The first value may comprise a value corresponding to spatial variations, e.g. a (local or global) maximum of an acoustic image. This maximum may be equal to a single value of the acoustic image, or result from an average made among the values of the acoustic image that are in a determined intensity relative percentage, e.g., in the top 5% of intensity of the acoustic image, or other. The first value may thus be determined from a portion only of the values resulting from a spatial processing.

Alternatively, the first value may be a not localized value, i.e., a value that could be determined without performing a spatial processing. The first value may for example be a noise value (for example an average power of a transducer signal in the absence of any sound pressure, i.e. internal transducer noise), an average sound pressure level value (for example when no spatially localized source is present, i.e. in a diffuse sound field, or for example when a spatially localized source is present, but has not been detected as such by the detector device), etc. Surprisingly, this method allows obtaining, possibly without any localization processing, a value of a sound emission parameter possibly issued by a spatially limited source that the detector device is able to detect. This can be done even if at step a) a single signal is received.

For example, the determination method may comprise adding or subtracting a predetermined parameter value to the estimated not localized value, e.g. 5 dB.

Advantageously, the predetermined value(s) of the determination method may have been obtained from properties of the detector device, e.g. the number of transducers, their relative positions, etc.

A possible method to obtain such a parameter value may be based on the assumption that the sound recorded does emanate from a hypothetical point source (i.e. a source confined to an infinitely small volume) at a given distance from an omnidirectional microphone of the transducer array. With this assumption, it is possible to determine the ratio between the sound emission at the source and the sound pressure level at the detector device (as a function of the distance). With the point spread function inherent to the detector device (a function characterizing how a point source is represented in an acoustic image, which may depend on the number of transducers and their relative positions, as well as the imaging algorithm employed), said point spread function being determined previously as function of the device, it is possible to determine the ratio between the sound emission parameter associated with a detected source and the largest possible sound emission parameter of possible corresponding spurious sources caused by the point spread function. For example, this ratio may be determined by the ratio between the value of the main lobe of the point spread function and the value of the highest side-lobe of the point spread function. Factoring in a safety margin to these ratios, it is therefore possible to determine the ratio between the sound pressure level at the detector device and the sound emission at the least powerful source that will be reliably detectable at a given distance. This ratio can be then converted in dB and subtracted from the first value, e.g., an actually measured sound pressure level at the detector device.

In an embodiment, and in particular in case of passive listening, the method may comprise, at step b), processing the signal in view of detecting sources, and selecting a method to determine the detection threshold value as a function of the number of sources that are detected.

The disclosure is not limited to a number of sources determination.

Advantageously, if no source is detected, the selected algorithm may be such that a not localized value is obtained from the at least one signal received at step a), e.g. a noise value, a pressure level value, and the threshold determining is done on this not localized value.

For example, the not localized value may be multiplied by a factor k, k being possibly smaller than 1, advantageously higher than 0.6 or 0.8. Alternatively, a predetermined value is added, or advantageously, subtracted, from this not localized value.

Surprisingly, this method allows determining a value of an acoustic parameter that equals or is not far from the smallest sound emission of a spatially localized phenomenon that would be detected by the detector device.

Advantageously, if a single source is detected, the method may comprise evaluating a value representative of the sound emission parameter for this source (as the first value), and determining the detection threshold value to be estimated at step b) from this evaluated value.

The determination method may imply only predetermined values and this evaluated value of the sound parameter for this source, e.g. subtracting 5 dB from the evaluated value.

Alternatively, the determination method may imply the evaluated value of the sound emission parameter for this source and at least one other value obtained from the at least one signal received at step a).

For example, the detection threshold value may be computed in function of the maximum side-lobe of the point spread function.

Advantageously, if several sources are detected and localized, the determination method may involve at least one value representative of the sound emission parameter, e.g., intensity, for at least one respective detected source (as at least one first value) and at least one another value calculated from the received signals.

For example, the detector device's point spread function may be evaluated for all detected sources, given their positions and intensity, and their respective side-lobes may be superposed and added, resulting in a pattern of combined side-lobes that depends on the detected sources' positions and intensity, and from which the acoustic parameter value may be computed, e.g. by taking the ratio between the highest source intensity and the maximum of the pattern of combined side-lobes.

Step c) may be performed using a look-up-table and/or applying a formula. In both cases, the value determined at step b) is associated with a quantity characterizing the physical phenomenon.

When the physical phenomenon is a gas leak, step c) may take the difference between the pressures on either sides of the wall into consideration.

For example, the formula that is applied at step c) may be a function of this difference between the pressures on either sides of the wall that is likely to present leaks, or the look-up-table has at least 2 dimensions, one of the dimensions corresponding to this difference between the pressures on either sides of the wall, and another one corresponding for example to SPL values. Advantageously, the detector device may be designed so as to be capable to detect (among other things) leaks that have a rate smaller than 0.1 liter per second at a distance of 1 meter. That is, the detector device may be adapted for quite small leaks.

Advantageously, the detector device may be designed so as to be capable to detect leaks that have a rate higher than 0.1 mL per second at a distance of 1 meter.

For example, the detector device may be designed so as to be capable to detect at a distance of 1 meter leaks that have a rate between 0.2 ml per second and 1 L per second.

Advantageously, the detector device may be designed so as to be able to detect a physical phenomenon based on received signals that have a SPL between 0 dB and 100 dB.

Advantageously, step(s) b) and/or c) may be performed taking into consideration the nature of a gas that is likely to flow through a possible leak in a wall and/or the nature of the gas on the other side of the wall.

Advantageously, step(s) b) and/or c) may be performed taking into consideration the pressure of a gas that is likely to flow through a possible leak and/or the pressure on the other side of the wall.

Advantageously, step(s) b) and/or c) may be performed taking into consideration the temperature of a gas that is likely to flow through a possible leak and/or the temperature on the other side of the wall.

Advantageously, step(s) b) and/or c) may be performed taking into consideration the humidity of the air of the environment.

In an embodiment, the value determined at step c) is displayed together with a value of a distance from the detector device.

This distance range between the detector device and the possible sources may for example be:
 fixed, e.g. be part of the specifications of the detector,
 set by the user (directly or indirectly by setting a focus distance),
 computed as a function of the received signals and of the relative positions of the transducers.

Advantageously, step(s) b) and/or c) may be performed taking into consideration a value of a distance.

For example, if an acoustic image is obtained, a focus distance may be taken into consideration for obtaining this acoustic image, at step b). The sensitivity may be displayed with this focus distance.

In case a reference source is provided or simulated, the distance between the provided/simulated reference source and the transducer array may be taken into consideration at step b), and the method may comprise displaying the distance between the provided/simulated reference source and the transducer array.

As the detection threshold depends also on the distance range within which leaks are to be detected (it is easier to detect a leak that is within 1 m from the detector than one that is at a distance of 100 m), the display of a sensitivity as a function of a maximum distance may lead the user to choose a smaller distance in very noisy environments, and therefore achieve a better detection at the cost of more displacements (for a hand-held detector) or the installation of more detectors (for fixed detectors).

Advantageously, the estimating done at step b) may be performed on a frequency band only.

Advantageously, it may be repeated for other frequency bands. That is, it is possible to obtain several detection thresholds, for several frequency bands.

The method described above may be used also to select the best frequency range for detecting a given type of leaks. The current environment may be more or less noisy at different frequencies, and certain types of leaks emit more sound at certain frequencies than at other frequencies. By evaluating the sensitivity for different frequency bands and switching to the frequency band where the sensitivity is lowest, the actual sensitivity of the device can be improved.

In a possible embodiment, the method may comprise, in case a source is detected at step b) and its spatial coordinates estimated, defining a zone of exclusion around said spatial coordinates and transmitting a message toward displaying means for the user be aware that the quantity estimated at step c) does not apply within this zone of exclusion.

For a given acoustic environment, in particular one that contains distinct sound sources, it is clear that small sound sources very close to the already detected/displayed sound sources cannot be resolved. For optical systems, there are criteria for this resolving power (or spatial resolution), which can be expressed by the minimum of an image on a straight line between two maxima (e.g. Rayleigh criterion: minimum is 26.3% smaller than maxima, for maxima of equal intensity). Based on similar criteria for acoustic images, zones of exclusion around displayed sound sources may be defined, where the detection threshold does not apply.

The areas on the acoustic image where the sensitivity is valid may be computed and displayed to the user, e.g., as an image superimposed with an optical image.

There is also provided a method executed by a sound emission detector device capable of detecting a physical phenomenon producing a spatially limited sound emission, said detector device being placed in an environment and comprising a transducer array, each transducer being arranged to measure a physical parameter relating to sound, comprising
  receiving a plurality of (preferably synchronized) signals from a plurality of respective transducers of the transducer array,
  processing the received signals so as to detect spatially limited acoustic sources, and in case a spatially limited acoustic source is detected, estimating, from (at least implicitly) a distance value between the transducer array and the detected source, a value of a parameter representative of the sound emission of said spatially limited detected source,
  converting the value of the parameter representative of the sound emission of said detected source into a quantity representative of a magnitude of the physical phenomenon,
  displaying the converted quantity so as to inform the user of the magnitude of the detected physical phenomenon.

This method allows informing the user about the physical features of interest of the detected physical phenomenon, e.g. a leak rate, not only about a sound recorded at the transducer array. The processing may comprise, in case a source is detected, estimating a localization of the detected source, e.g. by beamforming.

The processing may comprise, in case a source is detected, estimating a distance between the detected source and the transducer array.

Estimating of the value of a parameter representative of the sound emission of said detected source may be performed as a function of the distance between the detected source and the transducer array. The estimated value represents a value at the source, not a value of what is recorded at the detector device.

Therefore, converting this value into a quantity representative of a magnitude of the physical phenomenon may lead to a relevant value, that may turn out to be equal or quite close from a real quantity, e.g., from a real leak rate.

Advantageously, the display may be done only if the estimated value is within a range, corresponding to small noise, e.g. between 0 dB 100 dB SPL and/or if the quantity obtained after the conversion is within a range, corresponding to small physical phenomena, e.g., between 0.1 mL per second and 1 L per second.

As explained above, the quantity representative of a magnitude of the physical phenomenon may be a quantity of a parameter that is representative of a size of a leak, a quantity of a parameter that is function of a voltage and/or a current, etc.

The methods and the different features described above may be combined, or not.

There is also provided a computer readable medium storing computer executable code which when executed by a processor causes the processor to carry out at least one of the methods described herein above. The medium may be any entity or device capable of storing the program. For example, the medium can comprise a storage means, such as a ROM, for example a CD ROM or a microelectronic circuit ROM, or else a magnetic recording means, for example a hard disk.

There is also provided a computer program product comprising instructions for carrying out at least one of the methods described herein above when the program is executed by a processor. These programs can use any programming language, and be in the form of source code, binary code, or of code intermediate between source code and object code such as in a partially compiled form, or in any other desirable form for implementing the methods according to the disclosure.

It is further provided an apparatus for estimating the sensitivity in an environment of a sound emission detector device capable of detecting a physical phenomenon producing a spatially limited sound emission, said detector device comprising a transducer array, each transducer being able to measure a physical parameter related to sound, and processing means arranged so as to be capable of locating a possible source of sound emission from the signals issued from the transducers of the array, said apparatus comprising
  receiving means adapted to receive at least one signal from at least one respective transducer of the transducer array when said array is placed within said environment,
  processing means arranged to estimate from the at least one signal received by the receiving means a detection threshold value of a spatially limited source sound emission parameter, and to estimate from the estimated detection threshold value a quantity representative of a magnitude of the physical phenomenon, transmitting means to transmit a signal toward displaying means, said signal being generated a function of the estimated quantity so as to inform the user of the sensitivity of the detector device within this environment.

There is also provided an apparatus to be installed besides or within a sound emission detector device capable of detecting a physical phenomenon producing a spatially limited sound emission, said detector device being placed in an environment and comprising a transducer array, each transducer being arranged to measure a physical parameter relating to sound, comprising receiving means to receive at least one (advantageously, a plurality of) signal from at least one (advantageously from a plurality of) respective transducer of the transducer array, processing means to process the at least one received signal so as to detect spatially limited acoustic sources, and in case a spatially limited acoustic source is detected, to estimate a value of a parameter representative of the sound emission of said spatially limited detected source and convert the value of the parameter representative of the sound emission of said detected source into a quantity representative of a magnitude of the physical phenomenon, transmitting means to send toward displaying means a message generated from the quantity obtained by the processing means so as to inform the user of the magnitude of the detected physical phenomenon.

These apparatuses may for example comprise or be part of one or several processors. Each apparatus may be a circuit board or a processor for example.

The receiving means may for example comprise an input pin, an input port, a communication module, or other.

The processing means may for example comprise a CPU (for Central Processing Unit) core, or other.

The transmitting means may for example comprise an output pin, an output port, a communication module, or other.

In an embodiment, the apparatus for estimating the sensitivity may be separate from the detector device, but advantageously, it is integrated within said device.

There is further provided the detector device, comprising the transducer array, processing means arranged so as to able to locate a possible source of sound emission from the signals measured by the transducers of the array and the apparatus for estimating the sensitivity.

The processing means and the apparatus may be integrated on a same processor, or not.

There is further provided the detector device, comprising the transducer array and the apparatus that allows obtaining a quantity representative of a detected phenomenon.

The detector device may for example be arranged to detect gas leaks of industrial equipment.

Alternatively, the detector device may be arranged to detect a change in the noises emitted by ball, roller or friction bearings, and to estimate a state of wear and tear.

Advantageously, the detection may be based on the analysis of sound signals recorded at the transducers.

Advantageously, the detector device may be arranged for non destructive test of the industrial equipment based on a passive recording of audio and ultrasound signals at the transducers.

Advantageously, the transducers may be microphones, e.g. MEMS (for MicroElectroMechanical System) microphones.

BRIEF DESCRIPTION OF THE DRAWINGS

The disclosure is explained in further detail, and by way of example, with reference to the accompanying drawings, wherein.

DETAILED DESCRIPTION

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the disclosure. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

Figure 1:
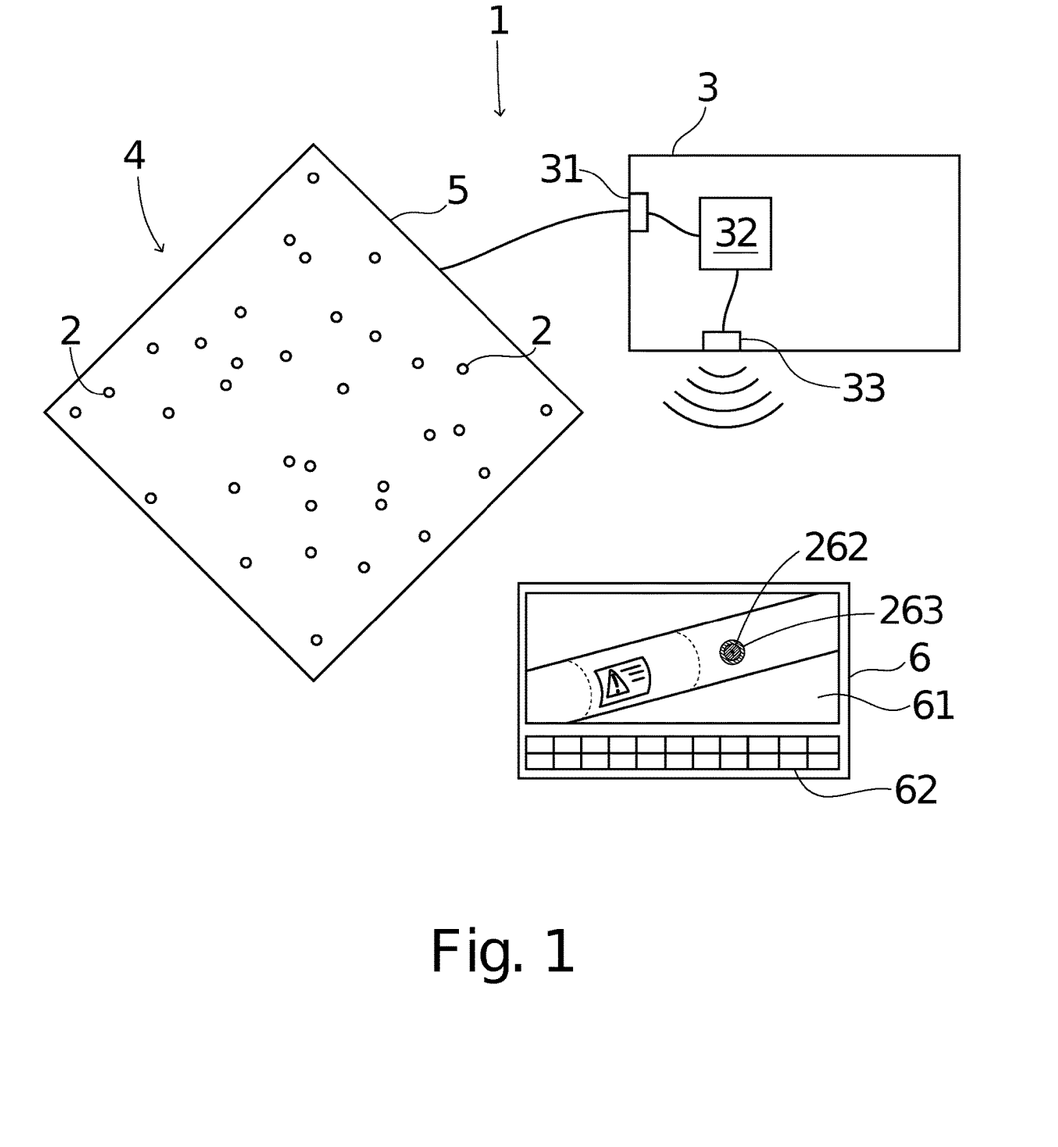
FIG. 1 schematically shows an example system according to an embodiment.

A detector device 1 as illustrated in FIG. 1 may comprise a transducer array 4 comprising a plurality of transducers 2, e.g. of MEMS microphones 2.

The MEMS microphones are spread at different locations on a two dimensional plate 5, i.e. the array 4 is planar.

In an alternative, not illustrated, embodiment, the transducer array may be 3D shaped. For example, the transducers may be on a surface of a sphere.

The MEMS microphones 2 may be arranged so as to record audio and ultrasound signals.

The detector device 1 allows non destructive test of an industrial equipment, e.g. pipes, tanks, or machinery.

The leak detection is based on a passive recording of audio and ultrasound signals at the MEMS microphones 2.

The MEMS microphones allow measuring the possible sound pressure waves generated by the flow of gas from a high pressure enclosure via a leak within a wall of this enclosure.

The microphones 4 have overlapping coverage.

The detector device 1 comprises an electronic circuit board 3 with a communication module 31 arranged to receive signals from the MEMS microphones 2 and a processor 32 in communication with the communication module 31.

The processor 32 is arranged to perform leak detection based on the signals received at the MEMS microphones 2. This processor 32 may perform a source localization algorithm, based for example on beamforming, e.g. on SRP (for "steered response power"), thus allowing not only to detect the presence of a leak but also to provide a localization of the detected leak.

Such algorithm is for example described in Microphone Array for Air Leakage Detection by Petr Eret and Craig Meskell published in Berlin Beamforming Conference 2012 (BeBeC 2012). In this paper, a type of beamforming algorithm, orthogonal beamforming, is used to locate air leaks. A superimposition of an optical image from a digital camera and of an acoustic image (the output of the beamforming algorithm) allows to show in real-time the potential leak locations, which correspond to the maxima of the image. Though electret microphones were used, there is nothing specific to this microphone technology and those of ordinary skill in the art would easily implement this method with MEMS microphones. Other possible types of beamforming are described in Beamforming: a versatile approach to spatial filtering by Barry D. Van Veen and Kevin M. Buckley published in IEEE ASSP magazine of April 1988, which present different types of beamformers that have optimal performance and characteristics depending of different use cases.

The processor 32 may also implement an acoustic holography method, a model-based method (such as described for example in A covariance fitting approach for correlated acoustic source mapping, Yardibi and Li, 2010), or another algorithm that combines the signals issued from the microphones and spatially filter the signals, thus resulting in lower detection threshold than single microphone detectors.

The processor 32 is connected to an output port 33 in communication with a terminal 6. In a not illustrated embodiment, the terminal 6 may be remote and the communications may take place via a network such as the Internet.

The terminal 6 comprises a user interface, e.g. a screen 61 and a keyboard 62.

In case a leak is detected, the processor 32 generates an alarm messages that is transmitted to this terminal so as to report the problem.

As illustrated in FIG. 1, an acoustic image may be superimposed to an optical image. In this case a spatially limited acoustic source has been identified and localized, thus resulting in displaying a zone in red 262 and yellow 263 on the optical image representing a pipe.

Figure 2:
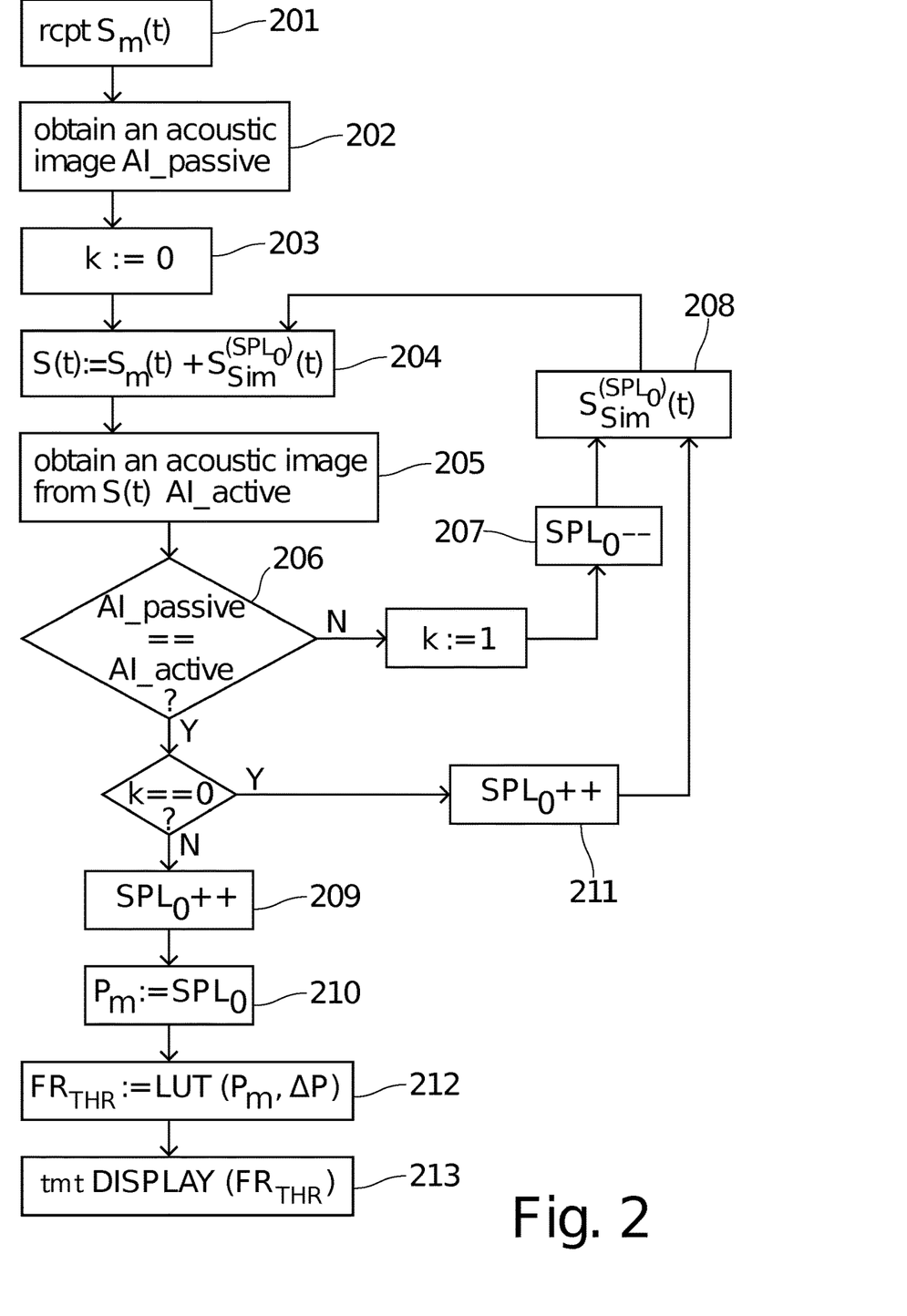
FIG. 2 schematically illustrates an example method according to an embodiment.
Figure 3:
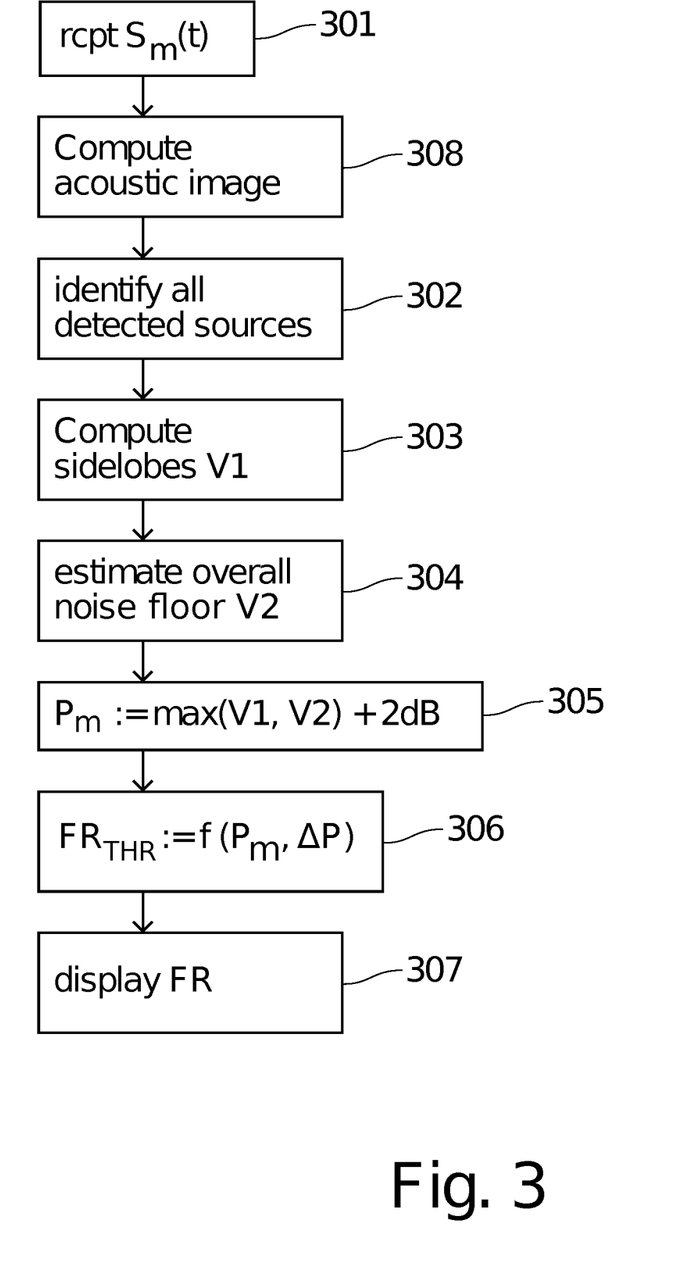
FIG. 3 schematically illustrates an example method according to another embodiment.
Figure 4:
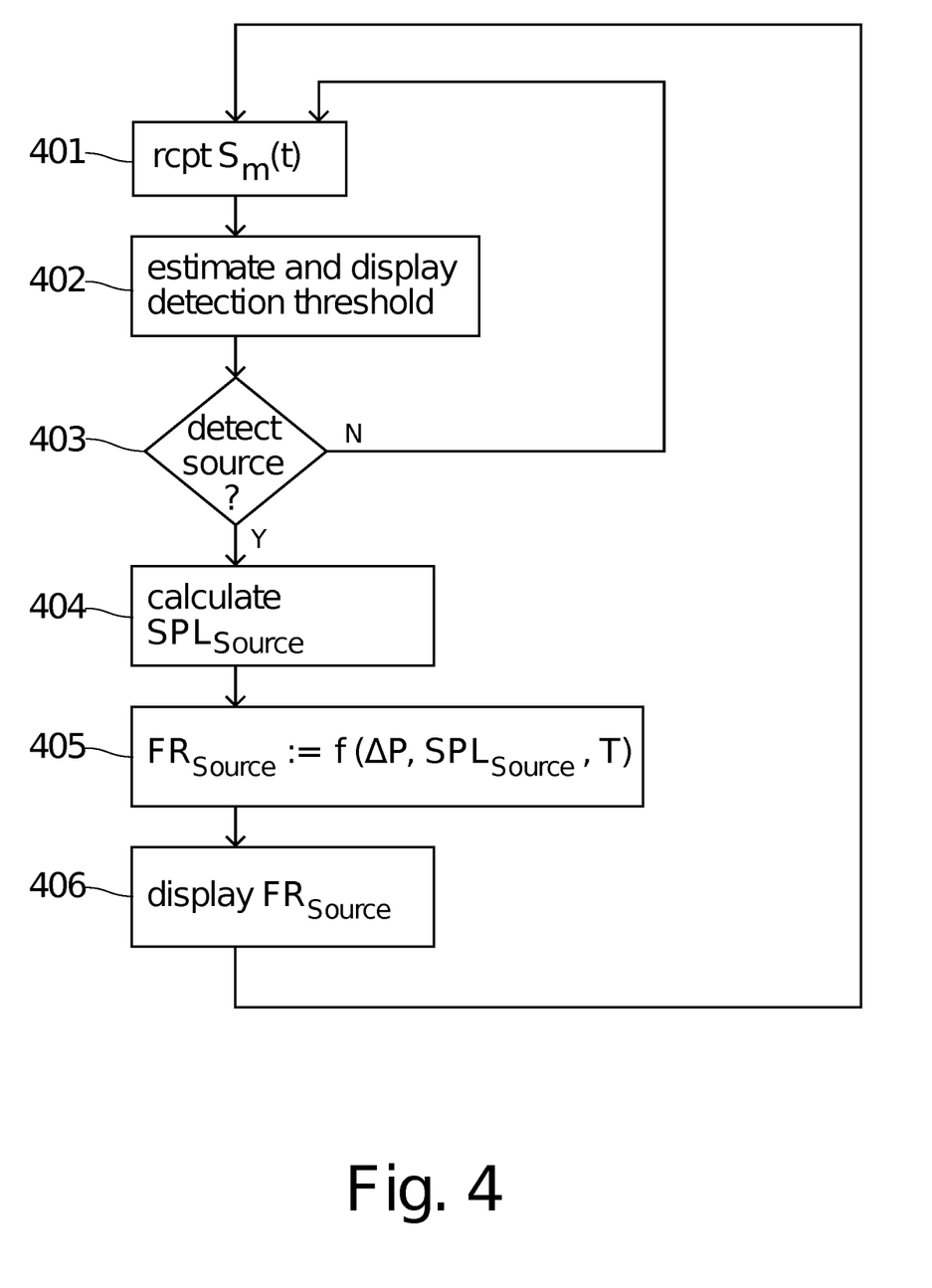
FIG. 4 schematically illustrates an example method according to another embodiment.

The processor 32 may be programmed so as to execute at least one of the methods described in reference to FIG. 2, FIG. 3 and FIG. 4.

In particular, the processor 32 is programmed so as to estimate in real time the sensitivity of the detector device 1.

It may for example be programmed so as to execute the steps of FIG. 2.

In a first embodiment (active detection), reference sources are provided or simulated, in which latter case the corresponding input signals are added to the measured input signals. Then, for a reference source, it is determined whether it is detectable or not, and the leak flow value corresponding to the smallest detectable reference source is displayed.

More precisely, sound emitted from gas leaks may be recorded in a very quiet environment using a system identical to the device employed by the users. The recordings (or simulations thereof) are to be performed for different values of multiple parameters: pressure difference, gas type, temperature, humidity, atmospheric pressure, distance, position, etc. The actual leak rate during the sound recording may be measured too.

When the device is used (either fixed or hand-held), two acoustic images are computed in parallel: one with the direct acoustic array output and one with the addition of one of the recordings. A comparison between the two acoustic images is then performed to see whether the superimposed leak would be found in this environment. Another recording with a smaller or greater leakage rate is then selected and the same operation is repeated until the smallest leak that can be detected in this environment is found. The corresponding leakage rate is then displayed to the user.

The user may have to select the gas type or other conditions (such as pressure difference, temperature, etc.). Alternatively, additional sensors could provide this information.

In the case where a user sees a leak then, the value displayed by the algorithm is the smallest leak that would be displayed besides the currently detected leak.

With reference to FIG. 2, the method may comprise a step 201 consisting in receiving a number of synchronized acoustics signals, measured by a number of transducers of the array, e.g. 100 signals. On FIG. 2, only a single signal Sm(t) has been mentioned for the sake of simplicity, but the reader understands that there are a plurality of signals that are measured simultaneously that are received at step 201.

At step 202, an acoustic image AI_passive is obtained from this plurality of signals received at step 201, e.g. by beamforming or another method.

Then, several reference sources are tested, in a loop. For the first loop, a Boolean variable k is chosen equal to zero (step 203).

At step 204, for each transducer, a simulated signal according to a reference source is added to the signal measured by this transducer. For the first loop, the simulated signals may be computed based on a predetermined first SPL value.

Then, at step 205, an acoustic image AI_active is obtained from the signals obtained at step 204.

It is compared with an acoustic image obtained with the signals recorded with the passive listening (step 206). The comparing step actually be more sophisticated than illustrated: one may calculate a sum over the pixels of the absolute values of the differences, and compare this sum to a threshold, for example.

If a difference is detected at step 206, k is set to 1, a lower value of the SPL of the reference source is chosen (step 207), the corresponding signals are computed (step 208) and added to the measured signals (step 204). Steps 205 and 206 are then repeated until no difference is found. Then, the previous SPL value (step 209) is selected (step 210) as the estimated detection threshold value.

If no difference is detected, k is kept at zero and a higher value of the SPL of the reference source is chosen (step 211), the corresponding signals are computed (step 208) and added to the measured signals (step 204). These steps are repeated until a difference is found, in which case the algorithms allows obtaining the estimated detection threshold value (steps 209 and 210).

At step 212, a flow rate value is obtained from the estimated value Pm and from a pressure difference. For example, it is read in a look-up-table.

At step 213, a message is generated as a function of the flow rate computed at step 212, so as to display this flow rate.

In an alternative (not illustrated) embodiment, at step b), no SPL is directly estimated, but instead, a ordered list of reference sources is stored in a memory, the list being ordered as a monotonic function of the sources emission parameter values corresponding to said reference sources. If at step 206, the source is detected, the method may comprise testing a neighboring source of the list, that has a smaller acoustic emission. If at step 206, no source is detected and k=0, the method may comprise testing a neighboring source of the list, that has a higher acoustic emission. Step 210 consists in obtaining the name of a reference source (that actually corresponds to the smallest source that is detected among the sources of the list). At step 212, a flow rate that is associated to this name is read from a memory.

FIG. 3 relates to another embodiment of the disclosure, based on a passive listening only.

For example, an overall noise floor (due to internal and ambient noise as well as other sources) may be determined. A SPL may be derived from this overall noise floor. This determination may allow obtaining a SPL value that is actually equal or very close to the weakest spatially limited source detectable anywhere in the field of view (outside possible detected sources of course). Then the method may comprise computing from this SPL value the flow that turns out to correspond to the weakest source found, and this flow value may be displayed.

Otherwise said, this method implies approximations with regards to the methods with reference sources, such as the one described with reference to FIG. 2. The known characteristics of the acoustic camera, such as side lobe patterns, internal noise, etc., are taken into consideration for the determination of the lowest intensity a sound source can have, without being masked in the current conditions.

Sources that cause masking may include other sound sources in the environment, ambient noise, internal noise (e.g. thermal noise of the sensors) or noise caused by the transformation and processing of signals (e.g. quantization noise). From this sound intensity, and the maximum distance, a leak flow estimate can be derived, e.g. by evaluating a fitted curve/surface, or looking up values in a table stored in the device. The data for such curve fits or lookup tables can be based on experiments or a fluid dynamics model.

A possible implementation of this method would be, with regard to FIG. 3:

Receive (step 301) a plurality of signals measured by a respective plurality of transducers of the array, compute an acoustic image (step 308) from the received signals and from the relative positions of the transducers, Identify (step 302) all currently detected sources (or further simplification: take maximum of current acoustic image);

Compute (step 303) side lobe with largest intensity caused by any of the currently displayed sources (based on known properties of acoustic camera);

Estimate (step 304) overall noise floor across acoustic image due to internal noise and ambient noise.

Determine (step 305) from the two values computed at step 303 et 304 side lobe and overall noise floor) a detection threshold SPL value, e.g. select the maximum of the two values obtained at step 303 and 304 and add a constant offset; the result is considered as the minimum sound intensity that a source can have and still be detectable.

For the maximum detection distance (fixed or user-defined), the given gas type, and the current frequency band, use a lookup table (not shown in FIG. 3), or an analytic function (step 306) to determine which leak flow rate corresponds to the sound intensity computed in the step above;

Display this flow rate $FR_{THR}$ (step 307) as a sensitivity within the current environment.

Referring back to FIG. 1, the processor may be programmed so as to perform the steps of FIG. 4.

Signals are measured at the transducers at step 401, and possibly the sensitivity may be estimated and displayed (step 402), e.g. with one of the methods described with reference to FIG. 2 or 3.

In an alternative, not illustrated embodiment, the processor 32 of FIG. 1 does not estimate the sensitivity.

The signals received at step 401 are processed so as to detect a source, e.g., by beamforming, and if a source is detected (step 403) its SPL is calculated (step 404).

This calculating takes into consideration an estimated location of the source, also obtained from the measured signals, and possibly from a knowledge of the environment. So the SPL value that is calculated at step 404 is far from a recorded value, it represents the sound emission of the detected source.

At step 405, this SPL value is converted into a flow rate value, e.g. by applying a formula.

At step 406, the flow rate value of the detected leak is displayed.

Then, the device may return to step 401, such that the failure quantification is done in real time.

Figure 5:
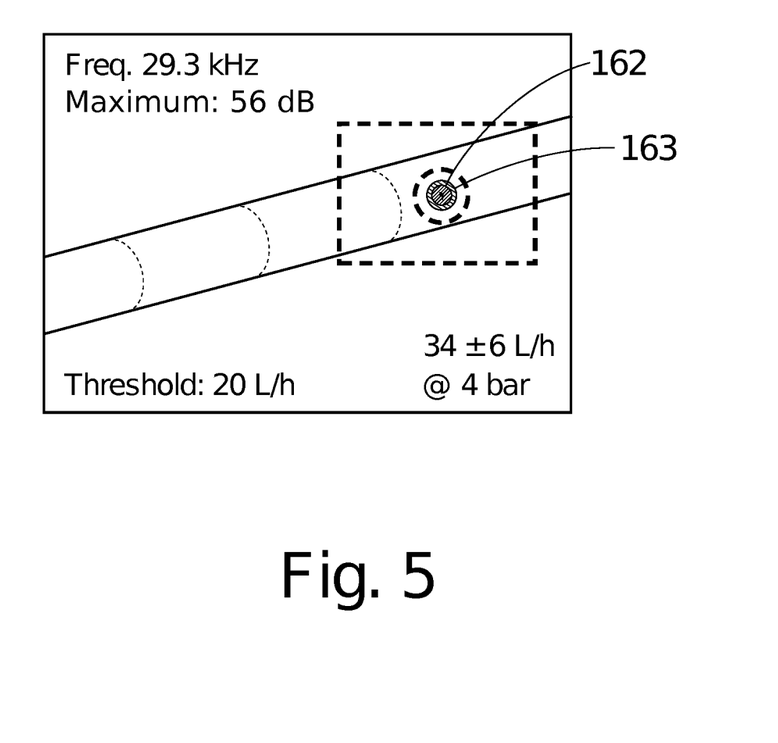
FIG. 5 schematically shows an example display possibly obtained with a method according to an embodiment.

Referring now to FIG. 5, an acoustic image may be superimposed to an optical image.

In this case, a spatially limited acoustic source has been identified and localized, thus resulting in displaying a zone in red 162 and yellow 163 on the optical image representing a pipe.

Further, the device computes a flow rate of the detected leak and displays it, e.g. 34 liters per hours, this estimate being made for a pressure of 4 bars within the pipe.

Further, a sensitivity at a determined distance from the detector is displayed, e.g. in liters per second. In this example, the detector device has computed that its sensitivity was 20 liters per hours at 1 meter.

The invention claimed is:

1. A method for determining, in an environment, the magnitude of the smallest physical phenomenon detectable by a sound emission detector device capable of detecting a physical phenomenon that produces a spatially limited sound emission from a volume of 10 cubic centimeters or less, the detector device comprising (i) a transducer array having a plurality of transducers arranged to measure physical parameters related to sound, and (ii) processing means arranged to locate a source of sound emission from a plurality of signals measured by the array of transducers, the method comprising:

a) receiving at least one signal from the array of transducers, the array of transducers being placed within the environment, b) adding a simulated signal of a predetermined value to the at least one signal from the array of transducers to produce a combined signal, the simulated signal corresponding to a computed or recorded signal of a spatially limited sound source, c) processing the combined signal and repeating steps a), b) and c) with a differing predetermined value of the simulated signal until an acoustic threshold value representative of the smallest detectable spatially limited sound source in the environment is determined, d) determining, from the acoustic threshold value and as a function of distance, a quantity representative of the magnitude of the physical phenomenon related to the smallest detectable spatially limited sound source in the environment, e) displaying, in real time, the magnitude of the physical phenomenon related to the smallest detectable spatially limited sound source in the environment.

2. The method according to claim 1, wherein steps a), b), c), d) and e) are performed repeatedly during the operation of the detector.

3. The method according to claim 1, wherein at step a), a plurality of signals are received, the plurality of signals resulting from a plurality of measurements obtained simultaneously by the plurality of transducers of the array, and step c) is performed taking into consideration the relative positions of the plurality of transducers.

4. The method according to claim 1, wherein steps b) and c) involve providing a spatially limited acoustic source instead of the simulated signal to produce the combined signal.

5. The method according to claim 1, wherein step c) further comprises determining a not localized acoustic parameter value from the at least one received signal, and subtracting a positive value of the acoustic parameter from the not localized value to obtain the acoustic threshold value of a spatially limited source sound emission parameter.

6. The method according to claim 1, wherein the method further comprises
processing a plurality of received signals so as to detect spatially limited acoustic sources, and in case a spatially limited acoustic source is detected, determining a value of a parameter representative of the sound emission of the detected source,
converting the value of the parameter representative of the sound emission of the detected source into a quantity representative of a magnitude of the physical phenomenon,
displaying the quantity determined at step d) so as to inform the user of the magnitude of the detected physical phenomenon.

7. The method according to claim 1, wherein the quantity determined at step d) is a quantity of a parameter that is function of a size of a leak.

8. A computer readable medium storing computer executable code which when executed by a processor causes the processor to carry out the method of claim 1.

9. An apparatus for determining, in an environment, the magnitude of the smallest physical phenomenon detectable by a sound emission detector device capable of detecting a physical phenomenon that produces a spatially limited sound emission from a volume of 10 cubic centimeters or less, the detector device comprising (i) a transducer array arranged to measure physical parameters related to sound, and (ii) processing means arranged so as to be capable of locating a source of sound emission from signals generated by the transducer array, the apparatus comprising:
receiving means adapted to receive at least one signal from at least one respective transducer of the transducer array when the array is placed within the environment,
processing means arranged to add a simulated signal of a predetermined value to the at least one signal from the transducer array to produce a combined signal, the simulated signal corresponding to a computed or recorded signal of a spatially limited sound source, and to process the combined signal and to repeat the receiving and adding steps with a differing predetermined value of the simulated signal until an acoustic threshold value representative of the smallest detectable spatially limited sound source in the environment is determined, and to determine, from the acoustic threshold value and as a function of distance, a quantity representative of the magnitude of the physical phenomenon as a function of distance related to the smallest detectable spatially limited sound source in the environment,
transmitting means to transmit a signal in real time to a display, the magnitude of the physical phenomenon related to the smallest spatially limited sound source detectable by the detector device within the environment.

10. A detector device for industrial equipment, comprising a transducer array and an apparatus as recited in claim 9.

11. A sound emission detector apparatus for detecting, in an environment, the magnitude of a physical phenomenon producing a spatially limited sound emission from a volume of 10 cubic centimeters or less, the apparatus comprising:
a transducer array having a plurality of transducers arranged to detect sound emissions within the environment and produce signals representative of the detected sound emission,
a signal receiver that receives signals from at least one of the transducers of the transducer array,
a processor programmed with instructions for processing the received signals, including producing a combined signal by adding a simulated signal of a predetermined value that corresponds to a computed or recorded spatially limited acoustic source, processing the combined signal and repeating the steps of producing and processing a combined signal with a differing predetermined value of the simulated signal until the smallest detectable spatially limited acoustic source in the environment is determined, and detect at least one spatially limited acoustic source and determine a value of a parameter representative of the sound emission of the spatially limited detected acoustic source and convert the value of the parameter representative of the sound emission of the detected acoustic source into a quantity representative of a magnitude of the physical phenomenon as a function of distance,
a display for displaying in real time at least the quantity representative of the magnitude of the physical phenomenon.

12. The apparatus of claim 11, wherein the physical phenomenon is a gas leak and the quantity representative of the magnitude of the physical phenomenon is a flow rate of the gas leak.

13. The apparatus of claim 11, wherein the physical phenomenon is an electrical discharge and the quantity representative of the magnitude of the physical phenomenon is a quantity of power.

14. The apparatus of claim 11, wherein the physical phenomenon is friction and the quantity representative of the magnitude of the physical phenomenon is a quantity of force.

15. The apparatus of claim 11, further comprising instructions for the processor to process the received signals to determine and display a detection sensitivity of the apparatus within the environment.

16. The apparatus of claim 11, further comprising instructions for the processor to process the received signals to determine and display the location of the physical phenomenon within the environment.

* * * * *